Patented Oct. 25, 1932

1,885,037

UNITED STATES PATENT OFFICE

FRIEDRICH MUTH, OF ELBERFELD, GERMANY, ASSIGNOR TO GENERAL ANILINE WORKS, INC., OF NEW YORK, N. Y., A CORPORATION OF DELAWARE

LEUCOINDOPHENOLS OF THE CARBAZOLE TYPE

No Drawing. Application filed November 13, 1929, Serial No. 407,006, and in Germany February 14, 1927.

My invention relates to new indophenol compounds and the process of preparing same. They probably have the general formula:

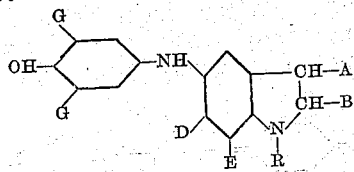

wherein A and B jointly stand for one of the groupings $-(CH_2)_3-$, $-(CH_2)_4-$ or $-(CH_2)_5-$, D and E stand for hydrogen or jointly for one of the groupings

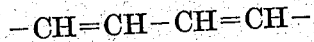

or

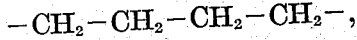

G stands for hydrogen or chlorine and R stands for hydrogen, alkyl, aralykl or aryl.

In accordance with the present invention the new compounds are produced by joint oxidation of a compound of the general formula:

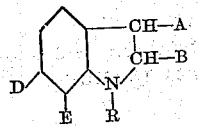

wherein A, B, D, E and R are defined as indicated in the above formula, with a p-aminophenol or by condensation of a compound of said type with a quinone halogen imid or with a p-nitroso-phenol, to form an indophenol and, if desired, treating it with reducing agents, such as alkali metal sulfide, alkali metal hydrosulfide or alkali metal bisulfite, to form the corresponding leuco compound. Among the different processes which lead to my new indophenols, I mention as particularly useful the joint oxidation of these said compounds with a para-aminophenol in aqueous mineral acid solution by means of an alkali metal bichromate, though in certain cases condensation with a quinone-halogen-imid or a p-nitroso-phenol might be preferred. Substantially identical indophenolic compounds are however produced, when using the qualified materials.

My new compounds are generally light greyish crystalline powders, soluble in warm water, alcohol and mineral acids and sparingly soluble in salt solutions. They form colorless solutions with aqueous alkalies, in which the leucoindophenols are easily oxidized to the corresponding dark colored indophenols. They produce in the polysulfide melt very valuable sulfur dyestuffs.

The following examples will illustrate my invention without limiting it thereto:

*Example 1.*—24.8 kg. of hexahydrocarbazole the preparation of which is described in Annalen 359, page 70 are suspended in 600 litres of water and dissolved by the addition of 230 litres of hydrochloric acid of 19.9° Bé.; a solution of 15.8 kg. of para-aminophenol in hydrochloric acid is added and then 20 litres of sulfuric acid of 60° Bé. The resulting solution is caused to flow quickly into an ice-cold aqueous solution of 29 kg. of sodium bichromate. When the oxidation is complete 90 litres of caustic soda (30%) are added and the solution is reduced by means of sodium sulfide or hydrosulfide until the deep red coloration is converted into the light yellow coloration of the leuco-indophenol. It is then rendered distinctly acid to Congo with mineral acid, heated to 60° C. and allowed to cool. The leuco indophenol thus obtainable of the probable formula:

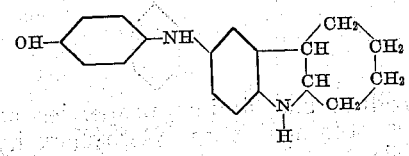

separates as a yellowish colored, sandy powder. It is filtered and washed, advantageously with common salt solution.

The leuco indophenol is soluble in caustic soda solution first to a colorless solution which then quickly oxidizes in the presence of air accompanied by an intense red coloration.

In an analogous manner tetrahydropentindole (the preparation of which is described in Journ. chem. Soc., London, 1928, page 100

1911) gives the leucoindophenol of the probable formula

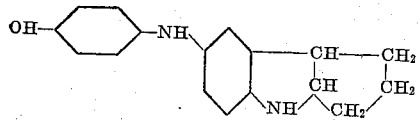

and hexahydroheptindole (the preparation of which is described in Jour. chem. Soc., London, 1928, 2583) gives the leucoindophenol of the probable formula:

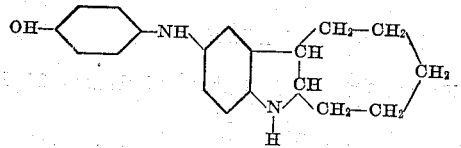

*Example 2.*—29.2 kg. of N-ethyl-hexahydrocarbazole which is prepared as described in Ber. d. Deutschen chemischen Gesellschaft 55, page 3802 are dissolved as described in Example 1 and oxidized with 15.8 kg. of para-aminophenol, as before, reduced and separated. It has the probable formula:

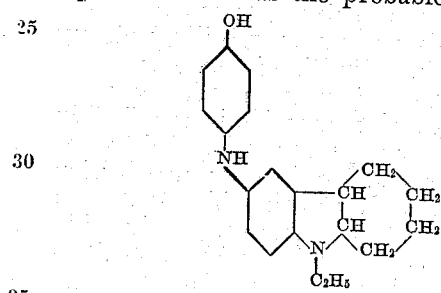

The aqueous alkaline solution of the leucoindophenol is oxidized in the presence of air accompanied by an intense blue coloration. By the addition of a mineral acid the coloration is changed towards violet.

In an analogous manner N-phenyl-hexahydrocarbazole yields the leucoindophenol of the probable formula:

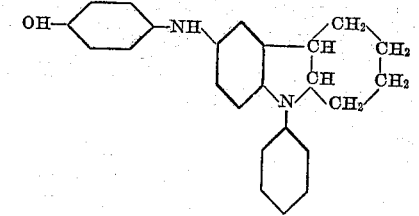

the product has similar properties as the product obtained from N-ethylhexahydrocarbazole.

The leucoindophenol of the probable formula:

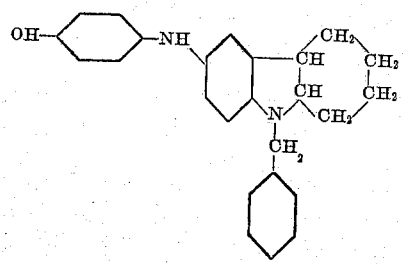

is prepared in the same manner as the products indicated above from benzylhexahydrocarbazole.

Hexahydro - α - β-naphthocarbazole (described in Journ. chem. Soc., London, 1928, page 1840) yields in an analogous manner the leucoindophenol of the probable formula:

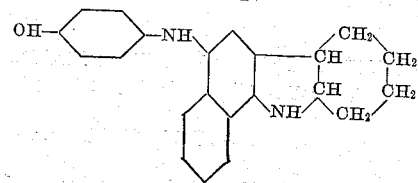

*Example 3.*—24.8 kg. of hexahydrocarbazole are dissolved in 300 litres of sulfuric acid of 66° Bé. which has been cooled to 10° C. 25 kg. of 2,6-dichloro-quinone-chlorimid are then gradually added, when the mass becomes violet. After stirring for a short time it is poured into caustic soda solution. The indophenol of the probable formula:

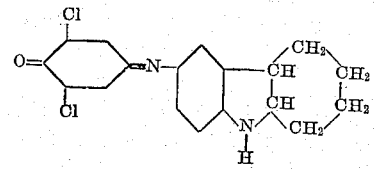

can now be salted out or reduced in the manner indicated in Example 1 to form the leucoindophenol of the probable formula:

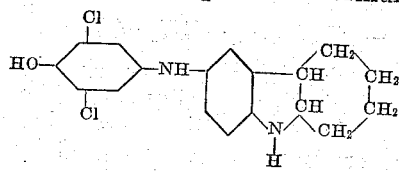

and worked up as disclosed in the said example.

I claim:

1. As new products the compounds of the probable general formula:

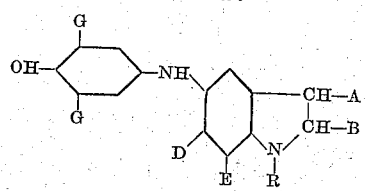

wherein A and B jointly stand for one of the groupings $-CH_2-CH_2-CH_2-$, $-CH_2-CH_2-CH_2-CH_2-$ or $-CH_2-CH_2-CH_2-CH_2-CH_2-$, D and E stand for hydrogen or jointly for one of the groupings $-CH=CH-CH=CH-$ or $-CH_2-CH_2-CH_2-CH_2-$, G stands for hydrogen or chlorine and R stands for hydrogen, ethyl, benzyl or phenyl, said compounds being generally light greyish crystalline powders, soluble in hot water, alcohol and mineral acids and sparingly soluble in salt solutions, forming colorless solutions with aqueous alkalies in which the leucoindophenols are easily oxidized to the corresponding dark colored indophenols, and producing in the polysulfide melt very valuable sulfur dyestuffs.

2. As a new product the compound of the probable formula:

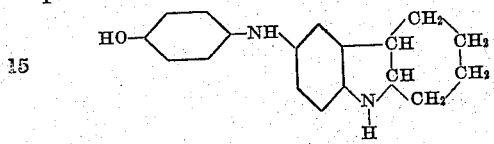

being a yellowish colored sandy powder, soluble in water, alcohol and mineral acids and sparingly soluble in salt solutions, forming colorless solutions with aqueous alkalies, in which the leucoindophenol is easily oxidized to the corresponding dark colored indophenol, and producing in the polysulfide melt very valuable sulfur dyestuffs.

3. As a new product the compound of the probable formula:

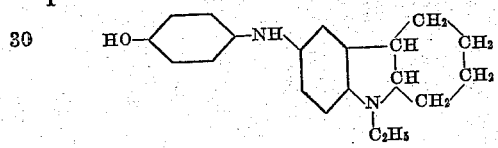

forming colorless solutions with aqueous alkalies, in which solutions the leuco indophenol is easily oxidized to the corresponding indophenol while the solution becomes blue colored changing to violet by the addition of a mineral acid, and producing in the polysulfide melt valuable sulfur dyestuffs.

4. As a new product the compound of the probable formula:

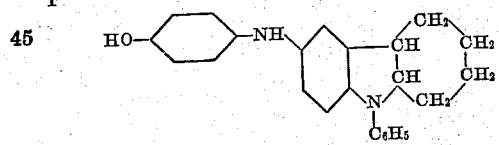

forming colorless solutions with aqueous alkalies, in which solutions the leuco indophenol is easily oxidized to the corresponding indophenol while the solution becomes blue colored changing to violet by the addition of a mineral acid, and producing in the polysulfide melt valuable sulfur dyestuffs.

FRIEDRICH MUTH.